No. 821,660. PATENTED MAY 29, 1906.
A. & H. S. MASTEN.
SNOW PLOW.
APPLICATION FILED FEB. 2, 1906.

2 SHEETS—SHEET 1.

WITNESSES.
O. Weston
W. B. Hudson.

INVENTORS.
Abraham Masten,
Herbert S. Masten.
by Edward N. Pagelsen
Attorney

No. 821,660. PATENTED MAY 29, 1906.
A. & H. S. MASTEN.
SNOW PLOW.
APPLICATION FILED FEB. 2, 1906.
2 SHEETS—SHEET 2.
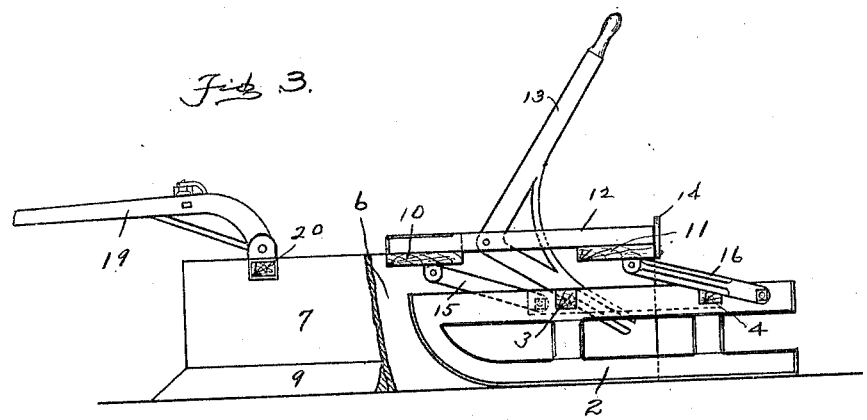
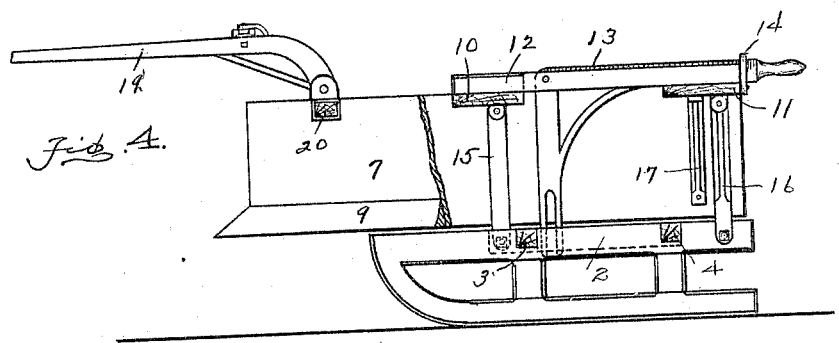
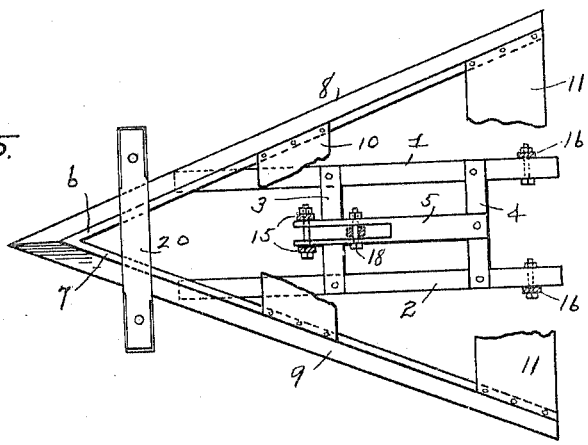
WITNESSES.
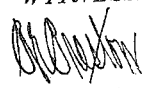
W. B. Hudson.
INVENTORS.
ABRAHAM MASTEN,
AND
HERBERT S. MASTEN.
by Edward N. Pagelsen.
Attorney.

UNITED STATES PATENT OFFICE.

ABRAHAM MASTEN, OF MILAN, AND HERBERT S. MASTEN, OF DETROIT, MICHIGAN.

SNOW-PLOW.

No. 821,660.      Specification of Letters Patent.      Patented May 29, 1906.

Application filed February 2, 1906. Serial No. 299,072.

*To all whom it may concern:*

Be it known that we, ABRAHAM MASTEN, a resident of Milan, in the county of Monroe, and HERBERT S. MASTEN, a resident of Detroit, in the county of Wayne, State of Michigan, citizens of the United States, have jointly invented a new and Improved Snow-Plow, of which the following is a specification.

Our invention consists in a snow-plow means for mounting the same on a vehicle, and means for adjusting the position of the plow with reference to the vehicle, all together forming a cheap, strong, and easily regulated and operated mechanism for the removal of snow from walks and roads.

The construction of a horse-plow embodying our invention is illustrated in the accompanying drawings, in which—

Figure 1:
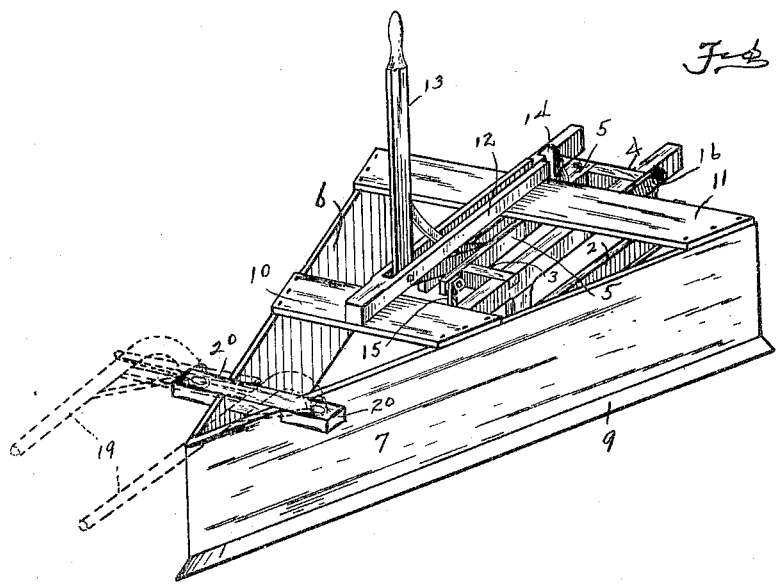
Figure 2:
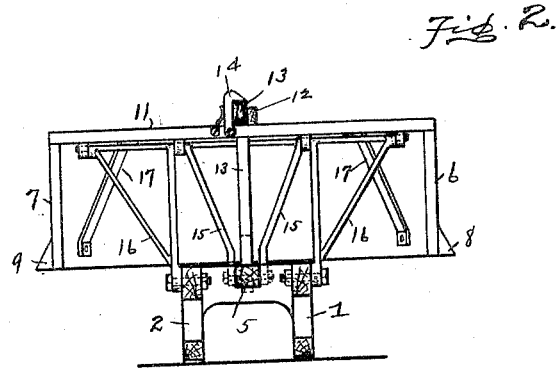

Figure 1 is a general perspective of the plow and vehicle. Fig. 2 is a rear view of the same with the plow elevated. Fig. 3 is a side view of the mechanism with the plow in a lowered position and partly broken away. Fig. 4 is a similar view with the plow elevated. Fig. 5 is a plan of the construction with the plow elevated.

Similar reference characters refer to like parts throughout the several views.

While wedge-shaped snow-plows are in general use during the northern winters, few are provided with appliances to avoid the excessive work of conveying them to the place where they are to be used, the usual plow requiring about as much horse-power to haul it or drag it over cleared roads as to drag it through moderate snow-drifts. To remedy this, we have provided the improvement shown in the drawings, which consists in a sled upon which the plow can be carried to the place where it is to be used and whereon it can again be placed when its work is complete.

In the drawings, 1 and 2 are two sleigh-runners of any desirable type, their size and strength depending upon the size and weight of the plow. These runners are connected by the cross-bars 3 and 4, which in turn carry the beam 5. The plow is shown in the shape of a wedge composed of the vertical sides 6 and 7 and the outwardly-extending lower portions 8 and 9. Any other type of plow that may be desired can be used. Secured across the plow to the sides 6 and 7 are the cross-bars 10 and 11, to which is attached the longitudinal beam 12, which carries the lever 13. This beam 12 may be bifurcated, as shown in Fig. 1. A hook 14, carried by the cross-bar 11, is adapted to hold down the outer end of the handle when swung down to position to hold up the plow. A pair of links 15, pivoted at their lower ends to the front end of the beam and at their upper ends to the cross-bar 10 of the plow, and a pair of rear links 16, pivoted at their lower ends to the rear ends of the runners and at their upper ends to the cross-bar 11, serve to support the plow. The braces 17 between the sides of the plow and the cross-bar 11 serve to stiffen the plow. The lever 13 is forked at its lower end and fits over the pin 18 in the beam 5. The tongue 19 is attached to the cross-piece 20 on the front end of the plow. By raising and lowering the outer end of the lever 13 the plow is caused to swing about the lower ends of the links 15 and 16 as a pivot from the position shown in Fig. 3 to that in Fig. 4.

Having now explained our improvements, what we claim as our invention, and desire to secure by Letters Patent, is—

1. In a snow-plow, the combination of a pair of sleigh-runners, cross-pieces carried thereby, a beam carried by the cross-pieces, links in pairs carried by the beam and the rear ends of the runners, a snow-plow comprising sides and cross-pieces, said links pivoted at their upper ends to the cross-pieces of the plow, and a lever mounted on the cross-pieces of the plow for determining the position of the plow with reference to the sleigh-runners.

2. In a snow-plow, the combination of a sleigh, links mounted pivotally on said sleigh, and a plow mounted on the ends of said links.

3. In a snow-plow, the combination of a sleigh, a plow, links for movably connecting said sleigh and plow and adapted to carry the plow when elevated above the sleigh, and a lever pivoted on the plow for swinging the same above the sleigh.

In testimony whereof we have signed our names to this specification in the presence of two subscribing witnesses.

ABRAHAM MASTEN.
          HERBERT S. MASTEN.

Witnesses:
    JNO. H. RUSSELL,
    H. D. MACDONALD.